US012683341B2

(12) United States Patent
Zhu et al.

(10) Patent No.: US 12,683,341 B2
(45) Date of Patent: Jul. 14, 2026

(54) RADIO FREQUENCY CONTROLLER AND A COMMUNICATION MODULE HAVING THE SAME

(71) Applicant: Telefonaktiebolaget LM Ericsson (publ), Stockholm (SE)

(72) Inventors: Mindu Zhu, Beijing (CN); Shuaijun Li, Beijing (CN); Jianjun An, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 634 days.

(21) Appl. No.: 18/025,426

(22) PCT Filed: Sep. 9, 2020

(86) PCT No.: PCT/CN2020/114254

§ 371 (c)(1),
(2) Date: Mar. 9, 2023

(87) PCT Pub. No.: WO2022/051945

PCT Pub. Date: Mar. 17, 2022

(65) Prior Publication Data

US 2023/0318239 A1 Oct. 5, 2023

(51) Int. Cl.
*H01R 24/50* (2011.01)
*H01R 12/71* (2011.01)
*H01R 103/00* (2006.01)

(52) U.S. Cl.
CPC ........... *H01R 24/50* (2013.01); *H01R 12/718* (2013.01); *H01R 2103/00* (2013.01)

(58) Field of Classification Search
CPC ...... H01R 12/91; H01R 4/04; H01R 12/7082; H01R 13/2492; H01R 24/44; H01R 43/16;

(Continued)

(56) References Cited

U.S. PATENT DOCUMENTS 7,909,668 B2 3/2011 Mcalonis et al.
8,016,614 B2 9/2011 Xie et al.

(Continued)

FOREIGN PATENT DOCUMENTS

CN 206628678 U 11/2017
WO 2014075454 A1 5/2014

(Continued)

OTHER PUBLICATIONS

Sladek, Norbert J., et al., "Standardization of Coaxial Connectors in the IEC", Proceedings of the IEEE, vol. 74, No. 1, Jan. 14-18, 1986.

*Primary Examiner* — Julian D Huffman
(74) *Attorney, Agent, or Firm* — Murphy, Bilak & Homiller, PLLC

(57) ABSTRACT

A radio frequency connector is disclosed, comprising: an outer conductor having a hollow housing with outer electrical contacts at its ends; and an inner conductor comprising a central body configured to be installed inside the outer conductor and spaced from the outer conductor with an annular space therebetween. In each end region of the central body of the inner conductor, an elastic connection assembly is provided for electrically connecting the central body to a component to be connected. The elastic connection assembly comprises a male joint and a female joint which mate with each other to form an abutment connection, the male joint or the female joint having elasticity in a radial direction in the area of the abutment connection, one of the male joint and the female joint being provided on the central body, and the other of the male joint and the female joint being provided on the component to be connected. The central body of the inner conductor is directly connected to the component to be connected by means of the elastic connection assembly, without involving the outer conductor.

(Continued)

A communication module comprising the above-said radio frequency connector is also disclosed.

19 Claims, 7 Drawing Sheets

(58) Field of Classification Search
CPC .. H01R 2201/02; H05K 1/144; H05K 1/0216; H05K 2201/042; H05K 2201/10303; H05K 2201/10318
See application file for complete search history.

(56) References Cited

U.S. PATENT DOCUMENTS

| | | | | |
|---|---|---|---|---|
| 2018/0006420 | A1* | 1/2018 | Urtz, Jr. | H01R 24/525 |
| 2018/0294609 | A1 | 10/2018 | Zeng et al. | |
| 2018/0301834 | A1 | 10/2018 | Dandl et al. | |
| 2020/0091665 | A1 | 3/2020 | Maki | |
| 2020/0203901 | A1 | 6/2020 | Gruber | |

FOREIGN PATENT DOCUMENTS

| | | | |
|---|---|---|---|
| WO | 2020088105 | A1 | 5/2020 |
| WO | 2020099374 | A1 | 5/2020 |
| WO | 2020099375 | A1 | 5/2020 |

* cited by examiner

RADIO FREQUENCY CONTROLLER AND A COMMUNICATION MODULE HAVING THE SAME

TECHNICAL FIELD

The present disclosure generally relates to the technical filed of communication device, and more particularly, to a radio frequency (RF) connector and a communication module comprising the same.

BACKGROUND

This section introduces aspects that may facilitate better understanding of the present disclosure. Accordingly, the statements of this section are to be read in this light and are not to be understood as admissions about what is in the prior art or what is not in the prior art.

RF connectors are widely applied in radio base station products from telecommunication industry. Most of the existing RF connectors are in coaxial type and are widely used in scenarios of connecting a radio board to an antenna board, connecting a radio board to a filter unit, or connecting a filter unit to an antenna board. The existing RF connectors are commonly in the form of 3-piece part. In case of the application of connecting a radio board to a filter unit, for example, the RF connector comprises: a board connector, which can be soldered on the side of a printed circuit board (PCB) of a radio unit; a cavity connector, which can be pressed into or screwed into a cavity of the filter unit; and a bullet installed between the board connector and the cavity connector. In case of the application of connecting a radio board to an antenna board, the bullet is installed between a first board connector on a first PCB of a radio unit and a second board connector on a second PCB of an antenna unit.

The bullet of each kind of 3-piece RF connectors has the same structure which includes an outer conductor portion, a center conductor portion and an insulator between the outer conductor portion and the center conductor portion. By means of the transmission loop formed by the outer conductor portion and the center conductor portion as well as the PCB/cavity and the connectors thereon, current transmission goes through the center conductor portion and comes back via the outer conductor portion. The mechanical and electrical performance of the RF connector, such as offset tolerance and RF reflection, will depend on the specific design of different variants of the RF connector.

Since the existing 3-piece design of the RF connector consists of a center conductor, an insulator and an outer conductor, many parts are required for producing a RF connector, resulting in complex production and high production cost.

Especially, during inserting the bullet to the board connector or cavity connector, both the center conductor portion and the outer conductor portion are under press and to be mated with counter parts at the same time. This will increase the damage risk for the board connector or cavity connector or the bullet.

Traditional 3-piece RF connector solution could have a couple of potential quality issues such as poor soldering on the board connector and stochastic damage on either the board connector/cavity connector or the bullet during assembly. It is hard to find the quality defects until system level test is performed during volume production.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for the RF connector which has a simplified structure and thus can simplify the production and reduce the production cost and also the assembly cost, and which provides improved quality and lengthened lifespan of the RF connector.

According to a first aspect of the present disclosure, an RF connector is provided, which comprises an outer conductor having a hollow housing with outer electrical contacts at its ends, and an inner conductor comprising a central body configured to be installed inside the outer conductor and spaced from the outer conductor with an annular space therebetween. In each end region of the central body of the inner conductor, an elastic connection assembly is provided for electrically connecting the central body to a component to be connected. The elastic connection assembly comprises a male joint and a female joint which mate with each other to form an abutment connection, the male joint or the female joint having elasticity in a radial direction in the area of the abutment connection, one of the male joint and the female joint being provided on the central body, and the other of the male joint and the female joint being provided on the component to be connected. The central body of the inner conductor is directly connected to the component to be connected by means of the elastic connection assembly, without involving the outer conductor.

With the RF connector of the present disclosure, the elastic connection assembly and the central body function together as an inner conductor. A special outer electrical connection can be formed by an outer conductor with outer electral contacts. Therefore, the RF connector of the present disclosure has a structure much simpler as compared with the traditional 3-piece RF connector. In one particular embodiment, the housing of the outer conductor is in the form of a metal sleeve or a metal barrel.

In an embodiment of the disclosure, the inner conductor has male joints on both ends of the central body or female joints on both ends of the central body. This configuration allows producing the RF connector, especially the central body of the inner conductor in an easier way, as the joints on the board side/filter cavity side can be made the same, thus mass production can be carried out with high efficiency.

In an embodiment of the disclosure, the female joint has a mating cavity and the male joint has a plurality of elastic strips spaced by a plurality of dividing grooves in the circumferential direction, each of the elastic strips curving outwards in the radial direction such that a circular bulge portion is formed as an abutment portion which is inserted into the mating cavity through its opening and form the abutment connection with an inner wall of the mating cavity. In this case, the female joint can be designed in the shape of a hollow cylinder.

In an embodiment of the disclosure, the opening of the mating cavity has an enlarged guiding portion for guiding the insertion of the male joint into the mating cavity.

In an embodiment of the disclosure, the female joint is provided on the component to be connected, and has a base with a face that is opposite from the opening of the mating cavity and configured for forming planar connection with the component to be connected.

In an embodiment of the disclosure, the female joint has a plurality of elastic strips spaced by a plurality of dividing grooves in the circumferential direction, each of the elastic strips curving inwards in the radial direction such that a neck portion with a reduced circumference is formed as a clamping ring which is configured to abut against an outer circumferential surface of a main body of the male joint.

In an embodiment of the disclosure, the male joint is provided on the component to be connected, and has a support base with a face which is configured for forming planar connection with the component to be connected. In this case, the main body of the male joint can be designed in the shape of a pin.

In an embodiment of the disclosure, the male joint or the female joint that is provided on the component to be connected is in the form of a structural element welded to the component to be connected or is integrally formed with the component to be connected. For example, a recess structure formed in the PCB can be used as the female joint. Also, a hollow cylindrical element welded onto the PCB and protruding from the PCB can be used as the female joint as well.

In an embodiment of the disclosure, the central body and the male joint(s) or the female joint(s) provided on the ends of the central body are formed as an integral piece by a sheet metal processing.

In an embodiment of the disclosure, the outer conductor further comprises a conductive gasket and/or conductive glue that is placed in a recess formed at an end of the housing and works as the outer electrical contact.

In an embodiment of the disclosure, the conductive gasket comprises a ring-like metal spring with a plurality of elastic electrical contacts which are equally spaced in the circumferential direction and are configured to allow elastic deformation in the axial direction of the outer conductor.

In an embodiment of the disclosure, the conductive glue is placed around the periphery of the metal spring.

In an embodiment of the disclosure, the component to be connected is a PCB, and the housing of the outer conductor is integrally formed with an EMC cover provided on the PCB.

In an embodiment of the disclosure, the RF connector further comprises a dielectric insulator placed in the annular space between the inner conductor and the outer conductor, and the central body of the inner conductor is directly connected to the component to be connected by means of the elastic connection assembly, without involving the dielectric insulator.

In an embodiment of the disclosure, no dielectric insulator is provided in the annular space between the inner conductor and the outer conductor.

According to a second aspect of the present disclosure, a communication module is provided, which comprises a first component to be connected, a second component to be connected, and the above-said RF connector(s) provided between the first and second components and connecting the two to form a signal transmission loop. The first component to be connected may be a PCB, and the second component to be connected may be another PCB or a cavity filter.

With the RF connector of the present disclosure, the joint(s) of the elastic connection assembly that is provided on the PCB or the cavity filter and the central body of the inner conductor are connected directly without involving the outer conductor and/or, optionally, without involving the dielectric insulator provided between the inner conductor and the outer conductor, and an outer electrical connection is realized separately in an axial direction with a connection chain consisting of a circle ring of contact pad of the PCB, a metal sleeve and the highly conductive gasket/glue or copper spring between the contact pad and the metal sleeve.

So, in a particular embodiment of the RF connector of the present disclosure, only the inner conductor and the outer conductor are indispensable components, and the insulator could be omitted in many conditions. Hence, the RF connector of the present disclosure has a very simple structure as a whole.

A plurality of metal sleeves serving as the housing of the outer conductor could be integrated into a single metal part using a die casting technology, which thus provides improved production efficiency and allows more complexity in design.

Also, the central body of the inner conductor of the present disclosure is simple and can be manufactured by a sheet metal processing, including but not limited to deep drawing, stamping and bending. The overall cost of the RF connector is lower than the existing 3-piece solution for each connection loop. It will be an attractive benefit for 5G Massive multiple input multiple output (MIMO) radio product from cost saving point of view.

Furthermore, as compared with existing 3-piece design of the RF connector, the RF connector of the present disclosure has only a male/female joint of an elastic connection assembly of the inner conductor functioning as the board connector/the cavity connector of the existing RF connector, without the need of paying attention to co-planarity issues appearing in the board connector/the cavity connector of the existing RF connector. During soldering the male/female joint to the PCB, there is very low risk of poor soldering. Furthermore, during the assembly process, simple mating of the male and female joints of the elastic connection assembly will result in a very low assembly failure rate. The soldering and assembly quality will be improved therefore in mass production as a result of the simplified structure design of the RF connector according to the present disclosure.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

The embodiments of the present disclosure are described in detail with reference to the accompanying drawings. It should be understood that these embodiments are discussed only for the purpose of enabling those skilled in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. Those skilled in the relevant art will recognize that the disclosure may be practiced without one or more of the specific features or advantages of a particular embodiment. In other instances, additional features and advantages may be recognized in certain embodiments that may not be present in all embodiments of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Generally, applications of an RF connector can be classified into following two types: a board-to-board application, in which the RF connector is mounted between two PCBs; and a board-to-cavity application, in which the RF connector is mounted between a PCB and a cavity filter. For clearly illustrating the RF connector of the present disclosure, the board-to-board application and the board-to-cavity application are explained separately as follows:

Board-to-Board Application

First Embodiment

Figure 1A:
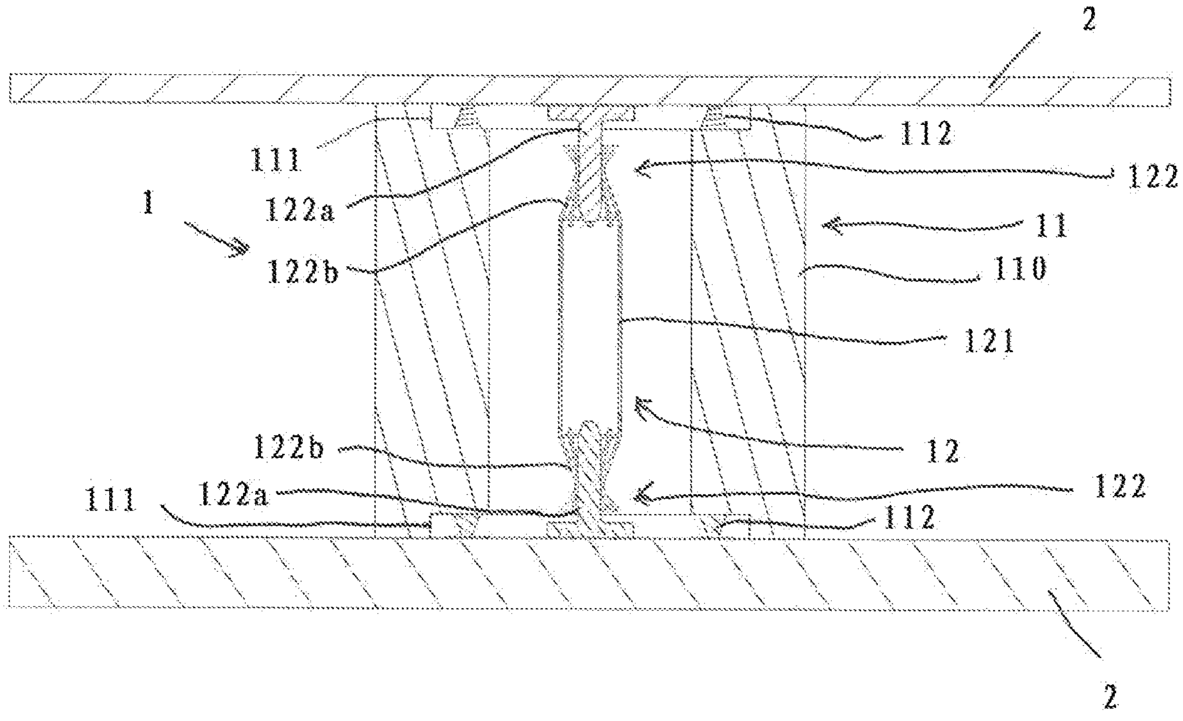
FIG. 1A shows a sectional view of an RF connector according to a first embodiment of the present disclosure mounted between a first PCB and a second PCB.

FIG. 1A shows an RF connector 1 according to a first embodiment of the present disclosure. The RF connector 1 comprises an outer conductor 11 which is electrically connected with the first and second PCBs 2 by electrical contacts at its ends, and an inner conductor 12 comprising a central body 121 and elastic connection assemblies 122 provided in each end region of the central body 121 for electrically connecting the central body 121 to the PCBs 2. The outer conductor 11 has a hollow housing which is embodied as a metal sleeve 110. At each end of the metal sleeve 110, a recess 111 is formed and communicates with a central bore of the metal sleeve 110, thereby forming a stepped hole. A ring of conductive material 112 is placed in each recess 111, working as outer electrical contacts abutting against contact pads of each PCB board 2. The inner conductor 12 is installed in a central bore of the metal sleeve 110 and spaced from an inner wall of the metal sleeve 110, thereby an annular space is formed therebetween. Each elastic connection assembly 122 comprises a male joint 122*a* and a female joint 122*b* which mate to each other to form an abutment connection. At least one of the male joint 122*a* and the female joint 122*b* has elasticity in a radial direction in the area of the abutment connection.

Figure 1B:
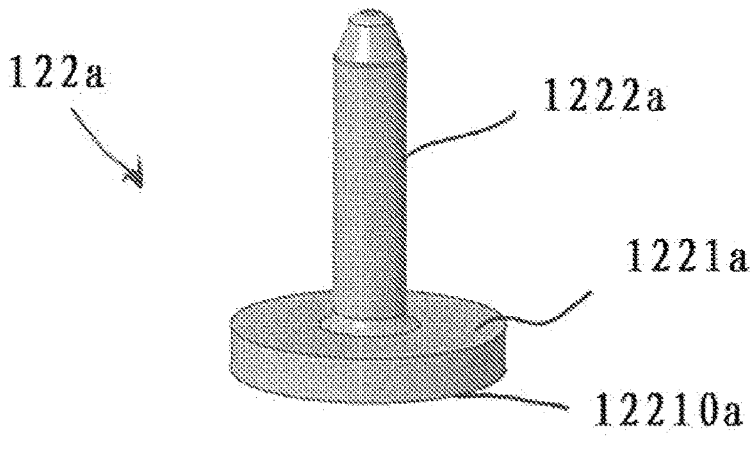
FIG. 1B shows a perspective view of a board connector in the form of a male joint of an elastic connection assembly of the RF connector according to the first embodiment.
Figure 1C:
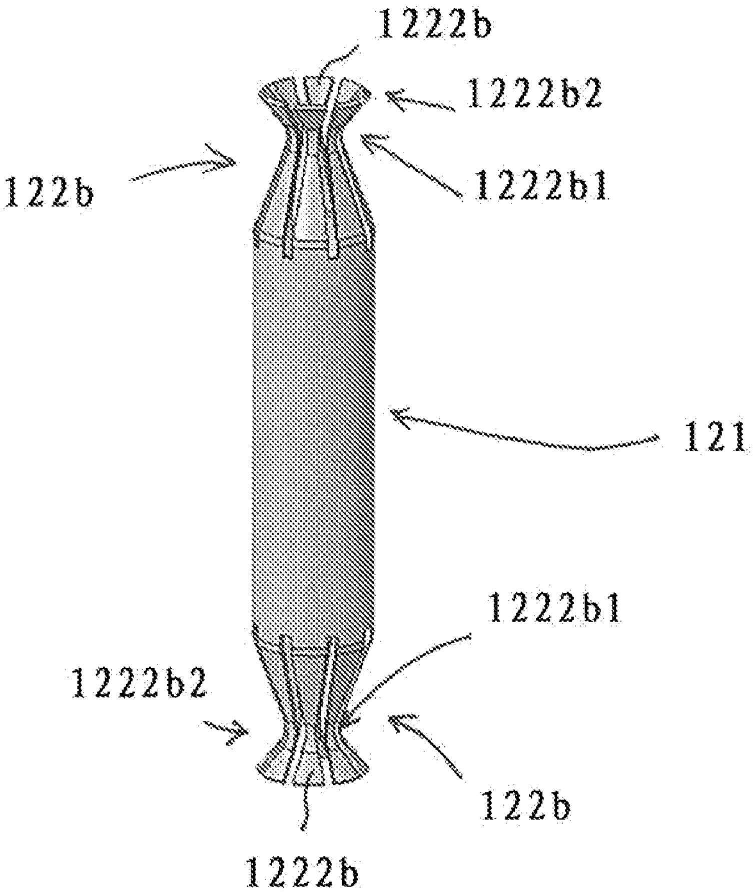
FIG. 1C shows a perspective view of a main part of an inner conductor of the RF connector of the first embodiment, which is provided with female joints at its ends.

Referring to FIG. 1B, it can be seen that the male joint 122*a*, which works as a board connector, is embodied as a rivet-like component, comprising a support base 1221*a* with a planar face 12210*a* configured for forming planar connection with the PCB board 2, and a pin-shaped element 1222*a* protruding from the support base 1221*a* as a main body of the male joint 122*a*. The support base 1221*a* can be soldered to the PCB board 2 directly with the planar face 12210*a* abutting against the PCB board 2. Referring to FIG. 1C, the female joint 122*b* provided on each end of the central body 121 is embodied as a grasping part, which comprises a plurality of elastic strips 1222*b* spaced by a plurality of dividing grooves in the circumferential direction, each of the elastic strips 1222*b* curving inwards in the radial direction such that a neck portion 1222*b*1 with a reduced circumference is formed as a clamping ring which is configured to abut against an outer circumferential surface of the pin-shaped element 1222*a* of the male joint 122*a*. With the provision of the elastic strips 1222*b*, elastic force provided thereby may help to adapt to the pin-shaped element 1222*a* with different diameters and also enables easy insertion of the pin-shaped element 1222*a* into the female joint 122*b* or easy extraction of the pin-shaped element 1222*a* from the female joint 122*b*.

Preferably, the female joint 122*b* has a horn-like guiding skirt 1222*b*2 provided in the end area of the elastic strips 1222*b* and extending outwards from the neck portion 1222*b*1. This horn-like guiding skirt 1222*b*2 may help to guide the insertion of the pin-shaped element 1222*a* of the male joint 122*a* into the neck portion 1222*b*1 of the female joint 122*b*.

As can be seen from FIG. 1C, the female joints 122*b* are integrally formed with the central body 121 into an integral piece. This integral piece can be formed by a sheet metal processing, such as deep drawing, cutting, bending, punching or welding. Therefore, the overall cost of the RF connector can be greatly reduced.

As can be seen from FIGS. 1A, 1B and 1C, the inner conductor 12 is actually a 3-piece part as a whole, providing the central electrical connection between the first and second PCBs 2. And this central electrical connection can be achieved independently, without involving any operations regarding the outer conductor 11. That is to say, no matter whether the outer conductor is arranged in place or not, the inner conductor 12 can be assembled well and put into a position ready for realizing the central electrical connection between the two PCBs 2.

Figure 1D:
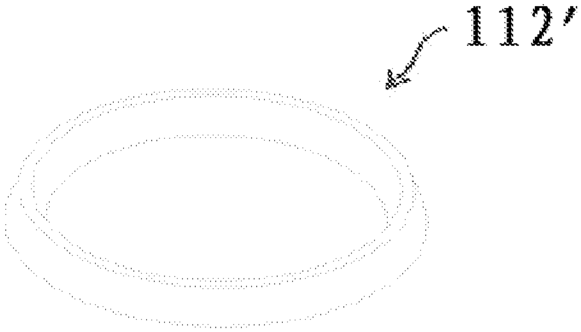
FIG. 1D shows a perspective view of a conductive gasket for the RF connector of the first embodiment.
Figure 1E:
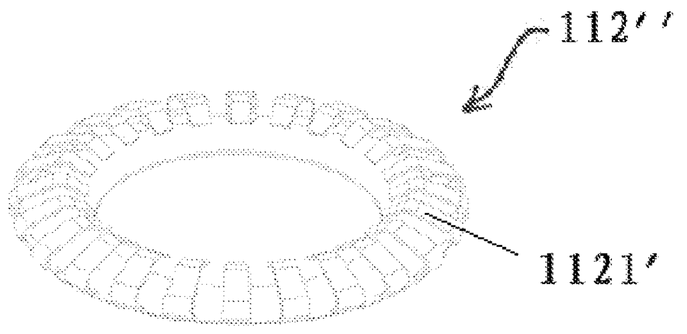
FIG. 1E shows a perspective view of a copper spring for the RF connector of the first embodiment.

As indicated with respect to FIG. 1A, a ring of conductive material 112 is placed in the recess 111 at each end of the metal sleeve 110. The conductive material 112 can be embodied as a conductive gasket 112' (which is shown clearly in FIG. 1D), conductive glue, or a ring-like metal spring 112" (for example, a copper spring as shown in FIG. 1E). The metal spring 112" may comprise a plurality of elastic electrical contacts 1121" which are equally spaced in the circumferential direction and are configured to allow elastic deformation in the axial direction of the metal sleeve 110. Once the conductive materials 112 in the recesses 111 are compressed and thus abut against predetermined portions of the PCBs, an outer electrical connection is formed thereby. It can be easily understood that, the conductive gasket, the conductive glue and the metal spring can be used either alone or in combination.

During the working of the RF connector 1 according to the first embodiment, the current will transmit through the inner conductor 12, and then goes back via conductive materials 112 and the metal sleeve 11 (as shown by the arrows in FIG. 2A), forming a signal transmission loop.

Second Embodiment

Figure 2A:
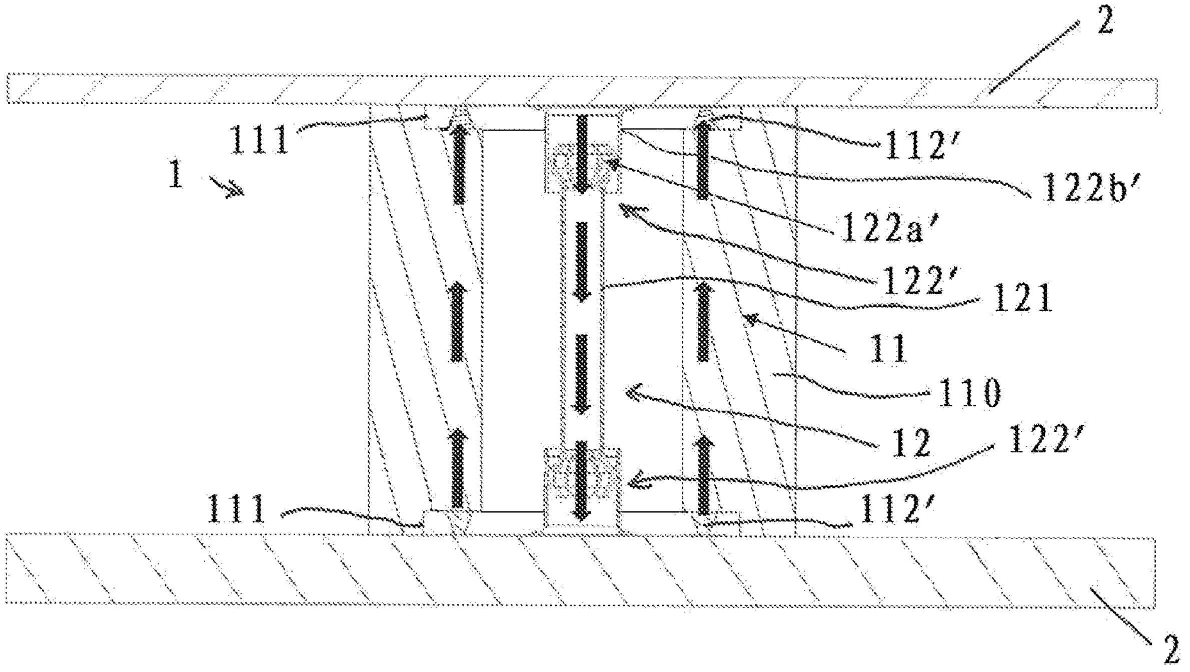
FIG. 2A shows a sectional view of an RF connector according to a second embodiment of the present disclosure mounted between a first PCB and a second PCB.

FIG. 2A shows a second embodiment of an RF connector 1 of the present disclosure. As compared with the first embodiment, the second embodiment of the RF connector differs only in the configuration of the elastic connection assembly 122'.

Figure 2B:
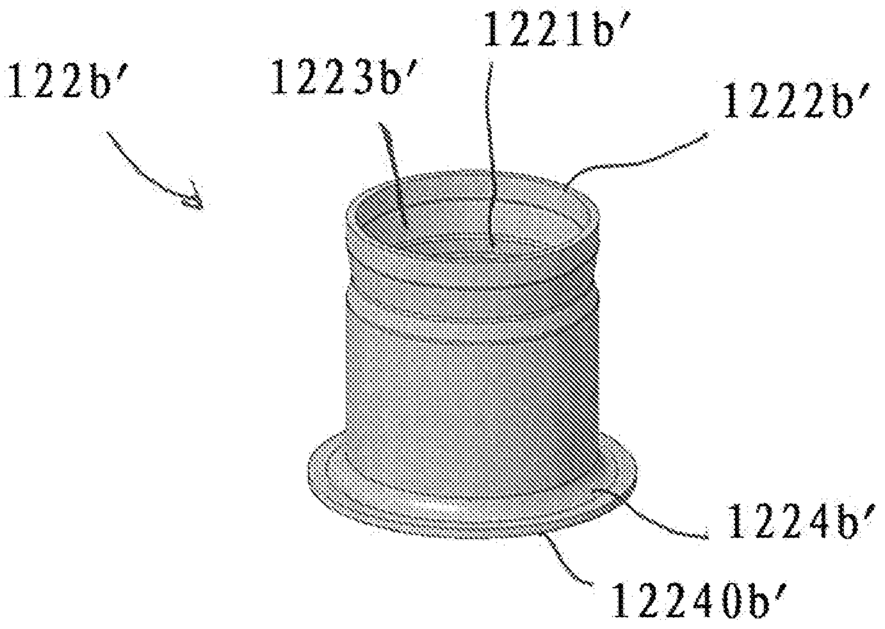
FIG. 2B shows a perspective view of a board connector in the form of a female joint of an elastic connection assembly of the RF connector according to the second embodiment.
Figure 2C:
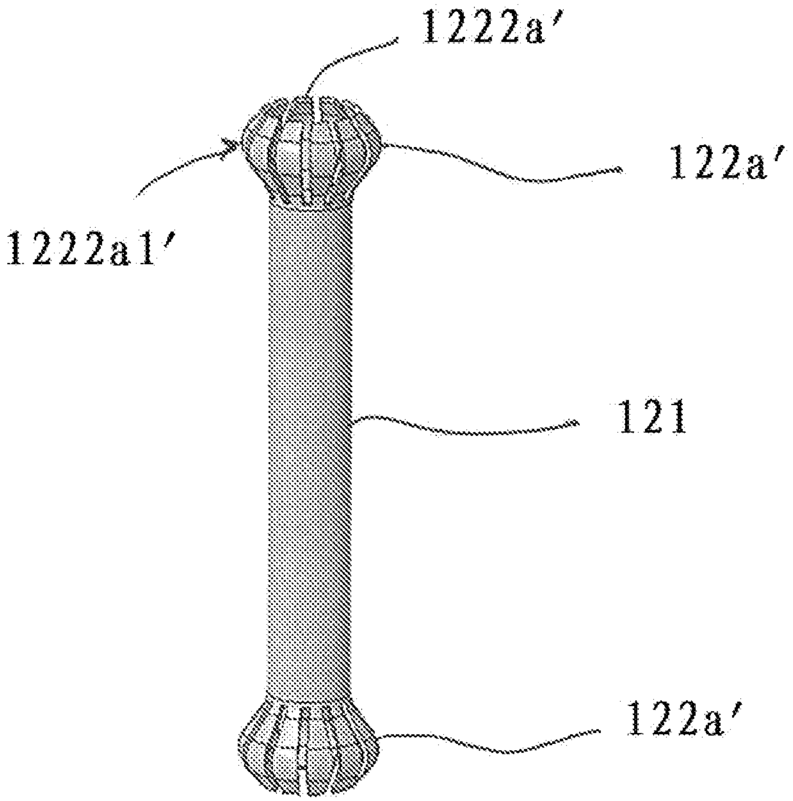
FIG. 2C shows a perspective view of a main part of an inner conductor of the RF connector of the second embodiment, which is provided with male joints at its ends.

Specifically, in the second embodiment of the RF connector 1, the male joint **122*a*' of the elastic connection assembly 122' is provided at the end of the central body 121, and the female joint 122*b*' is provided on the PCB board 2 as a board connector in the form of a barrel-shaped component having a mating cavity 1221*b*' (as shown in FIG. 2B). The mating cavity 1221*b*' has an opening 1222*b*' for the insertion of the male joint 122*a*'. The male joint 122*a*', as shown in FIG. 2C, comprises a plurality of elastic strips 1222*a*' spaced by a plurality of dividing grooves in the circumferential direction. Each of the elastic strips 1222*a*' curves outwards in the radial direction such that a circular bulge portion 1222*a*1' is formed as an abutment portion which is inserted into the mating cavity 1221*b*' of the female joint 122*b*' via the opening 1222*b*' and forms an abutment connection with an inner wall of the mating cavity 1221*b*'. Preferably, near the opening 1222*b*' of the mating cavity 1221*b*', there is an enlarged guiding portion 1223*b*' formed by an end portion of the wall of the mating cavity for guiding the insertion of the male joint 122*a*' into the interior of the mating cavity 1221*b*'. The female joint 122*b*' has a base 1224*b*' with a planar face 12240*b*' that is opposite from the opening 1222*b*' and configured for forming planar connection with the PCB 2. With this planar face 12240*b*', the female joint 122*b*' can be soldered to the PCB 2** directly.

As can be seen from FIG. 2C, the male joints **122*a*' are integrally formed with the central body 121** into an integral piece. This integral piece can be formed by a sheet metal processing, such as deep drawing, cutting, bending, punching or welding. Therefore, the overall cost of the RF connector can be greatly reduced.

As can be seen from FIGS. 2A, 2B and 2C, the inner conductor 12 is configured as a 3-piece part as a whole. The inner conductor 12 can be electrically connected with the PCBs 2 via the mating of the male joints **122*a*' and female joints 122*b*' soldered on the PCBs 2. The inner conductor 12 can be well assembled independently, without involving any operations regarding the outer conductor 11**.

Third Embodiment

Figure 3:
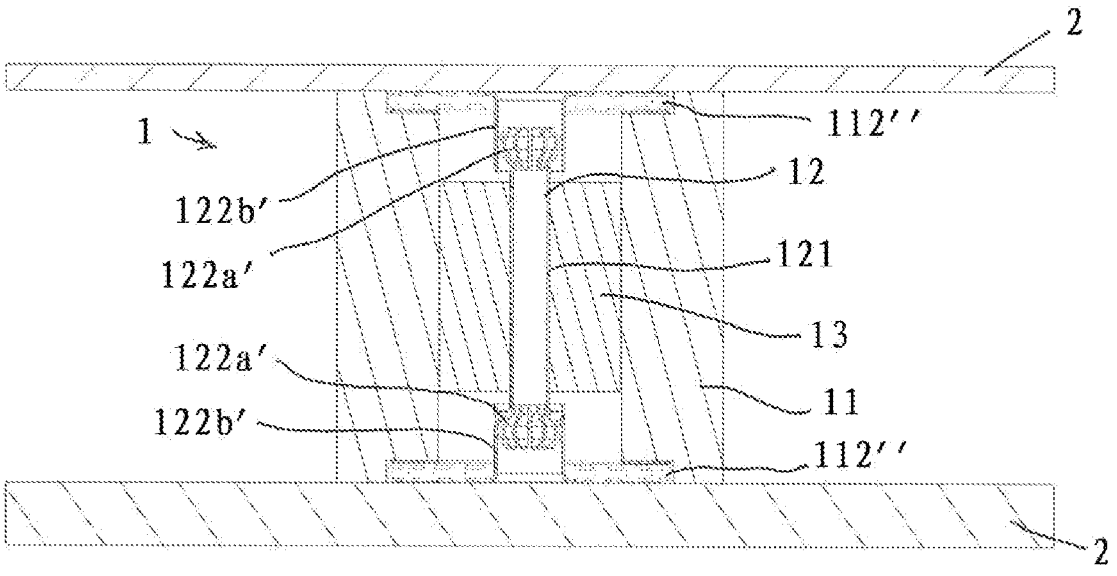
FIG. 3 shows a sectional view of an RF connector according to a third embodiment of the present disclosure, which has a dielectric insulator provided between an outer conductor and an inner conductor.

FIG. 3 shows a third embodiment of an RF connector 1 of the present disclosure. As compared with the second embodiment, the third embodiment of the RF connector 1 uses a metal spring 112" (rather than a conductive gasket 112') as the conductive material 112 and also adds a dielectric insulator 13 in the annular space between the inner conductor 12 and the outer conductor 11.

Generally speaking, the dielectric insulator 13 is not mandatorily needed. But in cases that impedance matching optimization or installation robustness calls for special attention, the dielectric insulator 13 could be flexibly designed with various forms and shapes and mounted around the central body 121 of the inner conductor 12 accordingly.

Fourth Embodiment

Figure 4:
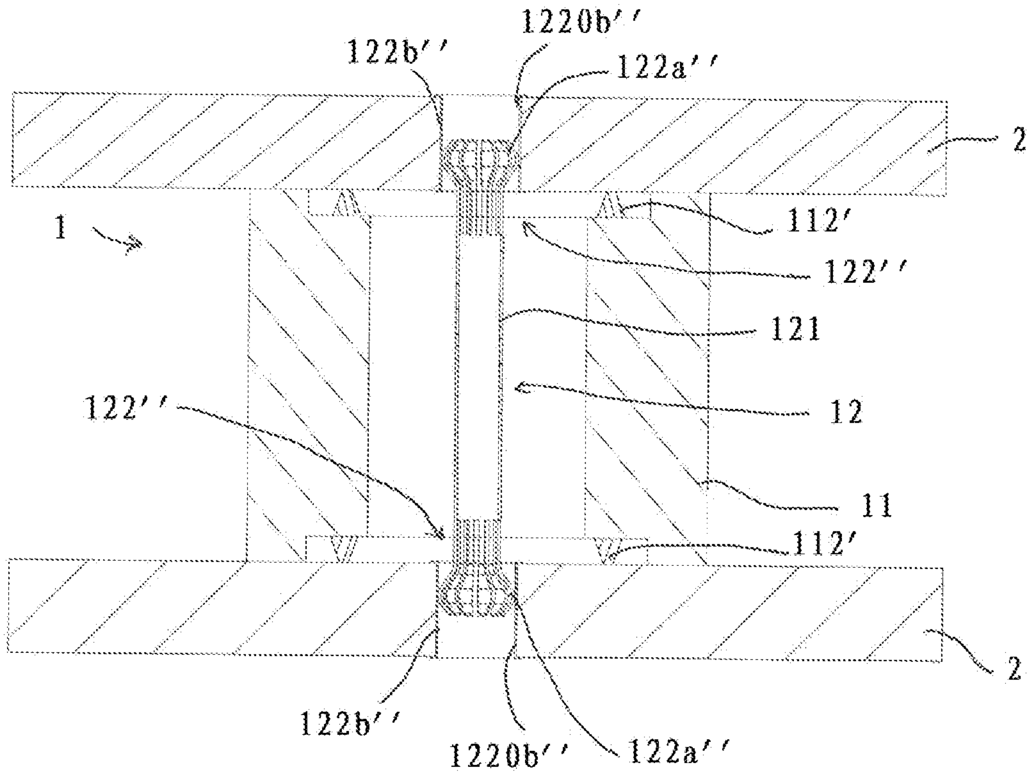
FIG. 4 shows a sectional view of an RF connector according to a fourth embodiment of the present disclosure, which is applied for the connection between a first PCB and a second PCB with through-holes provided thereon as female joints.

FIG. 4 shows a fourth embodiment of an RF connector 1 of the present disclosure. As compared with the second embodiment, the fourth embodiment of the RF connector differs in the configuration of the female joint **122*b*"**.

Specifically, through-holes are formed in each PCB 2 and function as the mating cavities of the female joints **122*b*". For reliable connection between the female joint 122*a*" and the male joint 122*b*", a metal coating or a metal layer 1220*b*"** may be applied to inner wall of the through-holes.

Although it is shown in FIG. 4 that through-holes formed on the PCBs 2 can function as the mating cavities of the female joint, it is easily conceivable that other forms of hollow structure, for example, blind holes, grooves or notches, can be provided in the PCBs as well to provide female joints for mating with the male joints **122*a*"**.

Board-to-Cavity Application

RF connectors are also widely applied in the connection scenario between a PCB and a cavity filter in a radio base station product.

Similar to the board-to-board application, the board-to-cavity application also uses an inner conductor to provide a central electrical connection between the PCB and the metal cavity part of the cavity filter, and uses an outer conductor (consisting of a compressed conductive material and a metal sleeve) to provide an outer electrical connection between the PCB and the metal cavity part of the cavity filter.

Fifth Embodiment

Figure 5:
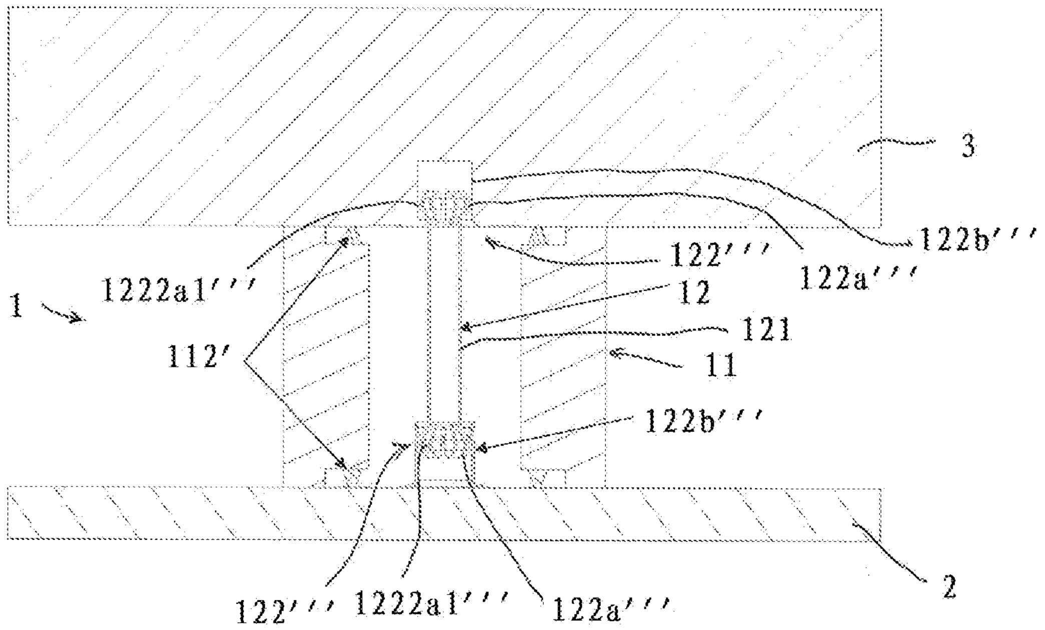
FIG. 5 shows a sectional view of an RF connector according to a fifth embodiment of the present disclosure, which is applied for the connection between a PCB and a cavity filter having a recess provided thereon as a female joint.

FIG. 5 shows a fifth embodiment of an RF connector 1 of the present disclosure. A cavity filter 3 has at least a cavity **122*b*'" inherently formed on its metal part. The cavity 122*b*'" can be used directly as a female joint of the elastic connection assembly 122'" for the RF connector 1, without the need of separately providing an addition element as a female joint. In this case, a male joint 122***a*''' is designed correspondingly to have a circular bulge portion 1222*a*1''' which can be inserted into the cavity 122*b*''' through its opening and forms an abutment connection with an inner wall of the cavity 122*b*'''.

Sixth Embodiment

Figure 6:
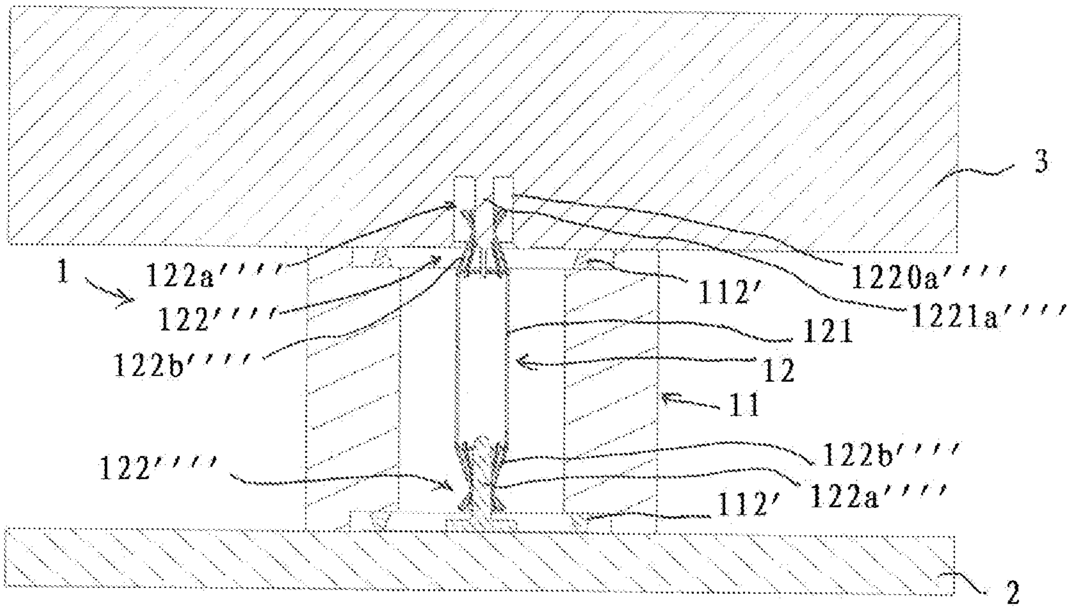
FIG. 6 shows a sectional view of an RF connector according to a sixth embodiment of the present disclosure, which is applied for the connection between a PCB and a cavity filter having a cavity with a protrusion integrally protruding from the bottom of the cavity as a male joint.

FIG. 6 shows a sixth embodiment of an RF connector 1 of the present disclosure. On a side of the metal cavity part of the cavity filter 3 facing the PCB 2, there is a cavity 1220*a*'''' formed with a protrusion 1221*a*'''' extending from the bottom of the cavity 1220*a*''''. For matching with this particular male joint 122*a*'''' comprising the cavity 1220*a*'''' and the protrusion 1221*a*'''', a female joint 122*b*'''' is designed in the form of a grasping part. Once the female joint 122*b*'''' is inserted into the cavity 1220*a*'''', the protrusion 1221*a*'''' slides into the grasping part in the meantime. As a result, the clamping ring of the grasping part abuts against the outer circumferential surface of the protrusion 1221*a*'''' under the action of the elastic force of the elastic connection assembly 122''''. In this case, the protrusion 1221*a*'''' can be used directly as a pin-shaped main body of the male joint, without the need of separately providing an additional element as the male joint.

Seventh Embodiment

Figure 7:
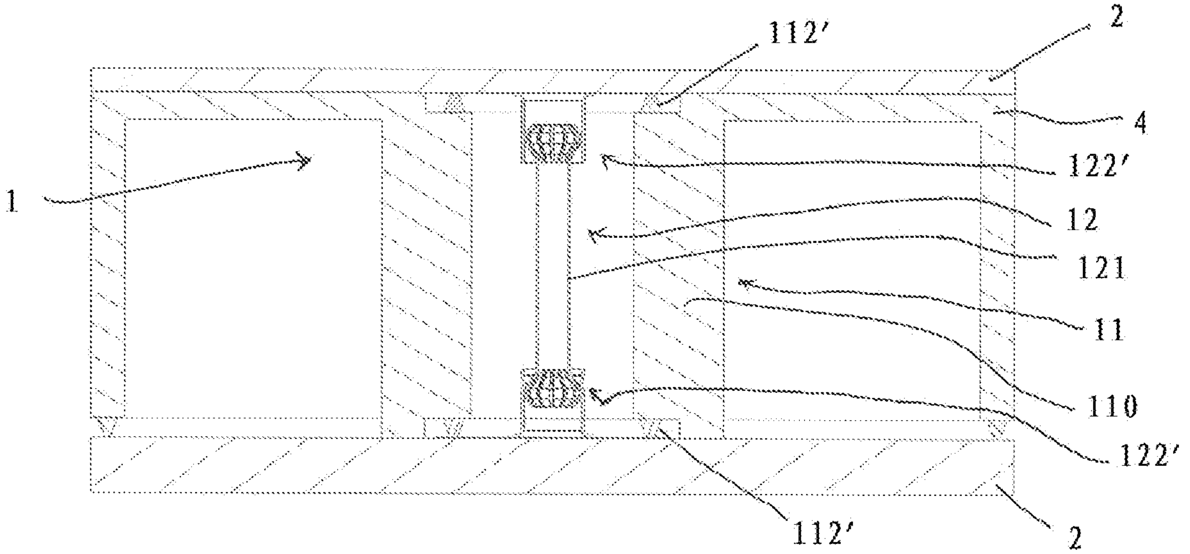
FIG. 7 shows a sectional view of an RF connector according to a seventh embodiment of the present disclosure for a board-to-board connection, in which a metal sleeve integrally formed on an EMC cover is used as a metal sleeve of an outer conductor.

FIG. 7 shows a seventh embodiment of an RF connector 1 of the present disclosure. As compared with the second embodiment, the seventh embodiment of the RF connector differs in the configuration of the metal sleeve 110 of the outer conductor 11.

In the radio station, there will always be metal part designed surrounding the radio transmitting channel due to the EMI shielding consideration. Taking the advantage of an EMC cover 4, the seventh embodiment develops a special outer electrical connection instead of using a separate outer conductor itself. In the seventh embodiment, the metal sleeve 110 is formed integrally on the EMC cover 4. Hence, it is possible to integrate a plurality of metal sleeves into a single EMC cover using a die casting technology, therefore improving production efficiency and reducing production cost.

Eighth Embodiment

Figure 8:
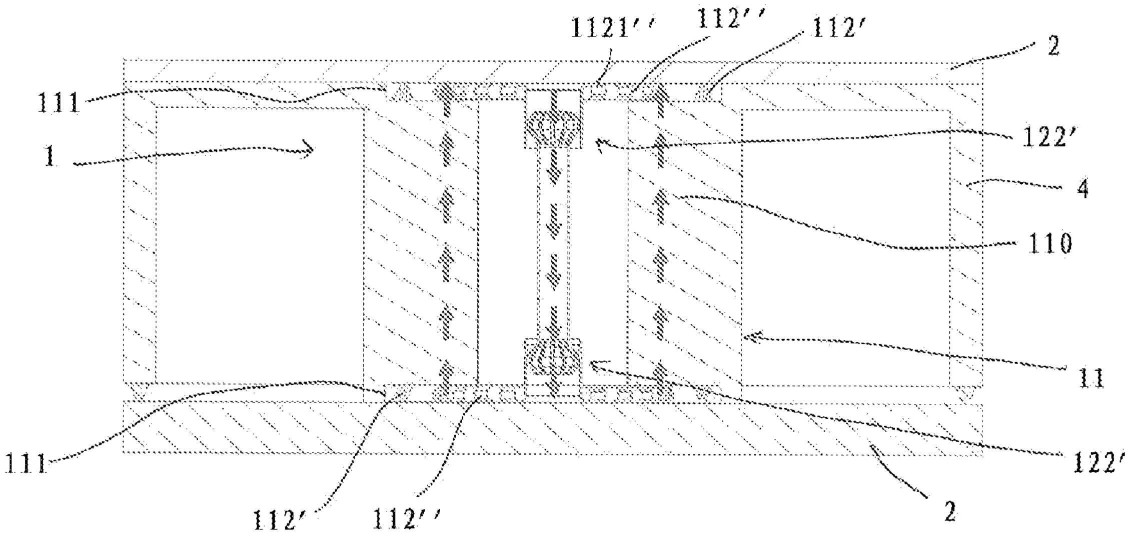
FIG. 8 shows a sectional view of an RF connector according to an eighth embodiment of the present disclosure for a board-to-board connection, in which conductive gaskets are placed around copper springs for stable current transmission between the outer conductor and the PCBs.

FIG. 8 shows an eighth embodiment of an RF connector 1 of the present disclosure. As compared with the seventh embodiment, the eighth embodiment of the RF connector differs in the arrangement of conductive materials 112 in a recess 111 formed at the end of the metal sleeve 110.

Specifically, a conductive gasket 112' is placed in the recess 111 and extends around the periphery of a metal spring 112", for the purpose of shielding. Meanwhile, the metal spring 112", for example, a copper spring, is placed in such a manner that the elastic contacts 1121" thereof can abut against the contact pad on the PCB 2 and realize the electrical connection therebetween.

Other Embodiments

Although it is shown in all the above embodiments of RF connector 1 that the joints provided at both ends of the central body 121 are of the same configuration, it is easily conceivable that they can be designed in different configurations. For example, one joint at a first end of the central body 121 is in the form of a grasping part (as shown in FIG. 1C) for grasping a pin-shaped portion of a male joint on the PCB or cavity filter, and the other joint at the second end of the central body 121 is formed with a bulging portion (as shown in FIG. 2C) for forming an abutment connection with a female joint on the PCB or cavity filter. Matching joints for each joint at the end of the central body 121 can be provided accordingly in view of the specific configuration of the PCB or the cavity filter to be connected.

Also, no matter whether a dielectric insulator is provided in the annular space between the metal sleeve 110 of the outer conductor 11 and the central body 121 of the inner conductor 12 or not, the central body 121 of the inner conductor 12 can be directly connected to the PCB(s) or the cavity filter by means of the elastic connection assembly, without involving the outer conductor or the dielectric insulator. In other words, when assembling the RF connector 1 of the present disclosure, it is not necessary that both the central body of the inner conductor and metal sleeve of the outer conductor should be handled at the same time. For example, the operator can put the central body of the inner conductor in a right place for the matching of the female and male joints, without taking the handling of the metal sleeve or the dielectric insulator (if any) into consideration. Thus, there is no need to consider concentricity issue occurring with the inner conductor and the outer conductor, and the soldering defects caused by low co-planarity in the board connectors of the existing RF connectors can be eliminated. Therefore, the RF connector of the present disclosure allows easy and flexible assembling and improved durability or lengthened life span.

References in the present disclosure to "an embodiment", "another embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A radio frequency connector comprising:
an outer conductor having a hollow housing with outer electrical contacts at its ends, wherein the outer conductor further comprises a conductive gasket and/or conductive glue that is placed in a recess formed at an end of the housing and works as the outer electrical contacts; and
an inner conductor comprising a central body configured to be installed inside the outer conductor and spaced from the outer conductor with an annular space therebetween;
wherein, in each end region of the central body of the inner conductor, an elastic connection assembly is provided for electrically connecting the central body to a component to be connected,
wherein the elastic connection assembly comprises a male joint and a female joint which mate with each other to form an abutment connection, the male joint or the female joint having elasticity in a radial direction in the area of the abutment connection, one of the male joint and the female joint being provided on the central body, and the other of the male joint and the female joint being provided on the component to be connected, and
wherein the central body of the inner conductor is directly connected to the component to be connected by means of the elastic connection assembly, without involving the outer conductor.

2. The radio frequency connector according to claim 1, wherein the inner conductor has male joints on both ends of the central body or female joints on both ends of the central body.

3. The radio frequency connector according to claim 1, wherein the female joint has a mating cavity and the male joint has a plurality of elastic strips spaced by a plurality of dividing grooves in the circumferential direction, each of the elastic strips curving outwards in the radial direction such that a circular bulge portion is formed as an abutment portion which is inserted into the mating cavity through its opening and form the abutment connection with an inner wall of the mating cavity.

4. The radio frequency connector according to claim 3, wherein the opening of the mating cavity has an enlarged guiding portion for guiding the insertion of the male joint into the mating cavity.

5. The radio frequency connector according to claim 3, wherein the female joint is provided on the component to be connected, and has a base with a face that is opposite from the opening of the mating cavity and configured for forming planar connection with the component to be connected.

6. The radio frequency connector according to claim 1, wherein the female joint has a plurality of elastic strips spaced by a plurality of dividing grooves in the circumferential direction, each of the elastic strips curving inwards in the radial direction such that a neck portion with a reduced circumference is formed as a clamping ring which is configured to abut against an outer circumferential surface of a main body of the male joint.

7. The radio frequency connector according to claim 6, wherein the male joint is provided on the component to be connected, and has a support base with a face which is configured for forming planar connection with the component to be connected.

8. The radio frequency connector according to claim 1, wherein the male joint or the female joint that is provided on the component to be connected is in the form of a structural element welded to the component to be connected or is integrally formed with the component to be connected.

9. The radio frequency connector according to claim 1, wherein the central body and the male joint or the female joint provided on the end of the central body are formed as an integral piece by a sheet metal processing.

10. The radio frequency connector according to claim 1, wherein the conductive gasket comprises a ring-like metal spring with a plurality of elastic electrical contacts which are equally spaced in the circumferential direction and are configured to allow elastic deformation in the axial direction of the outer conductor.

11. The radio frequency connector according to claim 10, wherein the conductive glue is placed around the periphery of the metal spring.

12. The radio frequency connector according to claim 1, wherein the component to be connected is a printed circuit board, and the housing of the outer conductor is integrally formed with an electromagnetic compatibility (EMC) cover provided on the printed circuit board.

13. The radio frequency connector according to claim 1, further comprising a dielectric insulator placed in the annular space between the inner conductor and the outer conductor, and the central body of the inner conductor is directly connected to the component to be connected by means of the elastic connection assembly without involving the dielectric insulator.

14. The radio frequency connector according to claim 1, wherein no dielectric insulator is provided in the annular space between the inner conductor and the outer conductor.

15. A communication module comprising:
a first component to be connected, wherein the first component to be connected is a printed circuit board;
a second component to be connected, wherein the second component to be connected is another printed circuit board or a cavity filter; and
a radio-frequency connector which is provided between the first and second components and connects the two to form a signal transmission loop, wherein the radio-frequency connector comprises:
an outer conductor having a hollow housing with outer electrical contacts at its ends, wherein the outer conductor further comprises a conductive gasket and/or conductive glue that is placed in a recess formed at an end of the housing and works as the outer electrical contacts; and
an inner conductor comprising a central body configured to be installed inside the outer conductor and spaced from the outer conductor with an annular space therebetween;
wherein, in each end region of the central body of the inner conductor, an elastic connection assembly is provided for electrically connecting the central body to the first or the second component,
wherein the elastic connection assembly comprises a male joint and a female joint which mate with each other to form an abutment connection, the male joint or the female joint having elasticity in a radial direction in the area of the abutment connection, one of the male joint and the female joint being provided on the central body, and the other of the male joint and the female joint being provided on the first or the second component, and wherein the central body of the inner conductor is directly connected to the first or the second component by means of the elastic connection assembly, without involving the outer conductor.

16. The communication module according to claim 15, wherein the inner conductor has male joints on both ends of the central body or female joints on both ends of the central body.

17. The communication module according to claim 15, wherein the female joint has a mating cavity and the male joint has a plurality of elastic strips spaced by a plurality of dividing grooves in the circumferential direction, each of the elastic strips curving outwards in the radial direction such that a circular bulge portion is formed as an abutment portion which is inserted into the mating cavity through its opening and form the abutment connection with an inner wall of the mating cavity.

18. The communication module according to claim 17, wherein the opening of the mating cavity has an enlarged guiding portion for guiding the insertion of the male joint into the mating cavity.

19. The communication module according to claim 17, wherein the female joint is provided on the first or the second component, and has a base with a face that is opposite from the opening of the mating cavity and configured for forming planar connection with the first or the second component.

* * * * *